358-84. OR 3,803,349 SR

United States Patent [19]

Watanabe

[11] 3,803,349

[45] Apr. 9, 1974

[54] TELEVISION AUDIENCE MEASUREMENT SYSTEM

[75] Inventor: Fumio Watanabe, Kangawa-ken, Japan

[73] Assignee: Video Research Ltd., Tokyo, Japan

[22] Filed: Oct. 18, 1972

[21] Appl. No.: 298,593

[30] Foreign Application Priority Data

Oct. 19, 1971 Japan .............................. 46-82651

[52] U.S. Cl. ................. 178/5.8 R, 325/31, 325/311

[51] Int. Cl. ............................................. H04n 5/60

[58] Field of Search ........... 325/31, 311; 179/2 AS; 178/5.6, 5.8 R

[56] References Cited

UNITED STATES PATENTS 2,958,766 11/1960 Evans .............................. 325/31 X 3,126,513 3/1964 Kamen ................................ 325/31

*Primary Examiner*—Robert L. Richardson

*Attorney, Agent, or Firm*—Fleit, Gipple & Jacobson

[57] ABSTRACT

Disclosed is a television audience measurement system in which successive sound i-f signals taken from monitor television receivers under the control of different control signals supplied from a main oscillator at predetermined frequencies are each compared with successive sound i-f signals from a television channel reception circuit, which includes a tuner section. If the sound signal from a given receiver coincides with a reference sound signal, the corresponding channel code is recorded in terms of character and bit signals on a magnetic tape or other suitable recording medium. At the same time, data concerning the monitor address and receiver number of said receiver is recorded along with a time signal supplied from the main oscillator.

14 Claims, 10 Drawing Figures

TELEVISION AUDIENCE MEASUREMENT SYSTEM

This invention relates to a television audience measurement system.

In conventional television audience measurement systems, discrimination of the reception channel is obtained through a system utilizing a rotary switch connected to the tuner knob of the home television receiver or through a system utilizing the detection of the local oscillator frequency in the receiver. Presently, both UHF channels and VHF channels are authorized, and three kinds of television receivers, namely receivers capable of receiving only VHF channels, receivers using a UHF converter to receive both UHF and VHF channels and all-channel receivers, are in use. It is determined that in the future only UHF channels will be available, so the future receivers will be designed to receive only UHF channels. With either one of the afore-mentioned two channel descrimination system, it is necessary to construct different measurement systems for the three different kinds of receivers. Particularly, the application of the first system to receivers with a UHF converter is difficult.

In this aspect, consideration has been given to a comparison between a 4.5 MHz sound i-f signal picked up from an intercarrier reception system receiver (at present there is no receiver that is not employing this type reception system) with sound i-f signals of channels successively received in a television channel reception circuit, which is provided in a measurement system. With this system, no difficulties are encountered with its use in any of the afore-mentioned three kinds of receivers.

According to the invention, there is provided a television audience measurement system, which is constructed on the basis of the pulse technique and utilizes the afore-mentioned system of comparing sound i-f signals, so that it can monitor "a plurality of television sets in each home".

For instance, where three television receivers, are used in one home or establishment, the sound i-f signals from these three receivers are successively monitored under the control of a control signal of predetermined frequency produced from a main oscillator output and are compared with successive sound i-f signals taken from the television channel reception circuit in the measurement system which includes a tuner section. If the sound signal from the receiver coincides with the comparison sound signal, the corresponding channel code is recorded in terms of character signals and bit signals on a magnetic tape or other recording medium (hereinafter represented by the magnetic tape). At the same time, data concerning the address of the home and number of the receiver receiving the recorded channel are recorded on the tape together with the time signal produced from the afore-mentioned main oscillator output along with data concerning the date of reception.

In addition to this data, other information concerning the starting and stopping of the operation of the measurement system, such as occurrence and recovery of power stoppage, area address, for instance representing such area as Tokyo or Osaka, is recorded in terms of the character signals and bit signals on the same magnetic tape as the reception data.

In order to obtain ready and reliable data processing of the tape record obtained by the measurement system according to the invention, character end signals indicating the end of one character and reference signals to be described later, are also recorded on the tape concurrently with the data recording.

Further, in order to facilitate recording of the data signal on the tape, a signal of about 1 kHz is produced by a frequency divider stage in the output circuit of the main oscillator, which converts the data signal into the signal having a frequency component of about 1 kHz. By doing so, the recording characteristics can be improved to permit the use of commercially available recording tapes.

Furthermore, a radio receiver is used to correct a crystal clock in the measurement system by utilizing the rising portion of the sinusoidal wave of the 880 Hz tone in a time announcement, thereby eliminating recording error concerning the reception time.

In order for the invention to be fully understood, it will now be described in connection with the accompanying drawings, in which:

FIG. 1 is a block diagram showing the entire circuit of the television audience measurement system according to the invention;

FIG. *2a* is a time chart to illustrate the production of character signals;

FIG. *2b* is a time chart to illustrate the production of bit signals;

FIG. *2c* shows a time relationship between character signals and bit signals;

Figure 1:
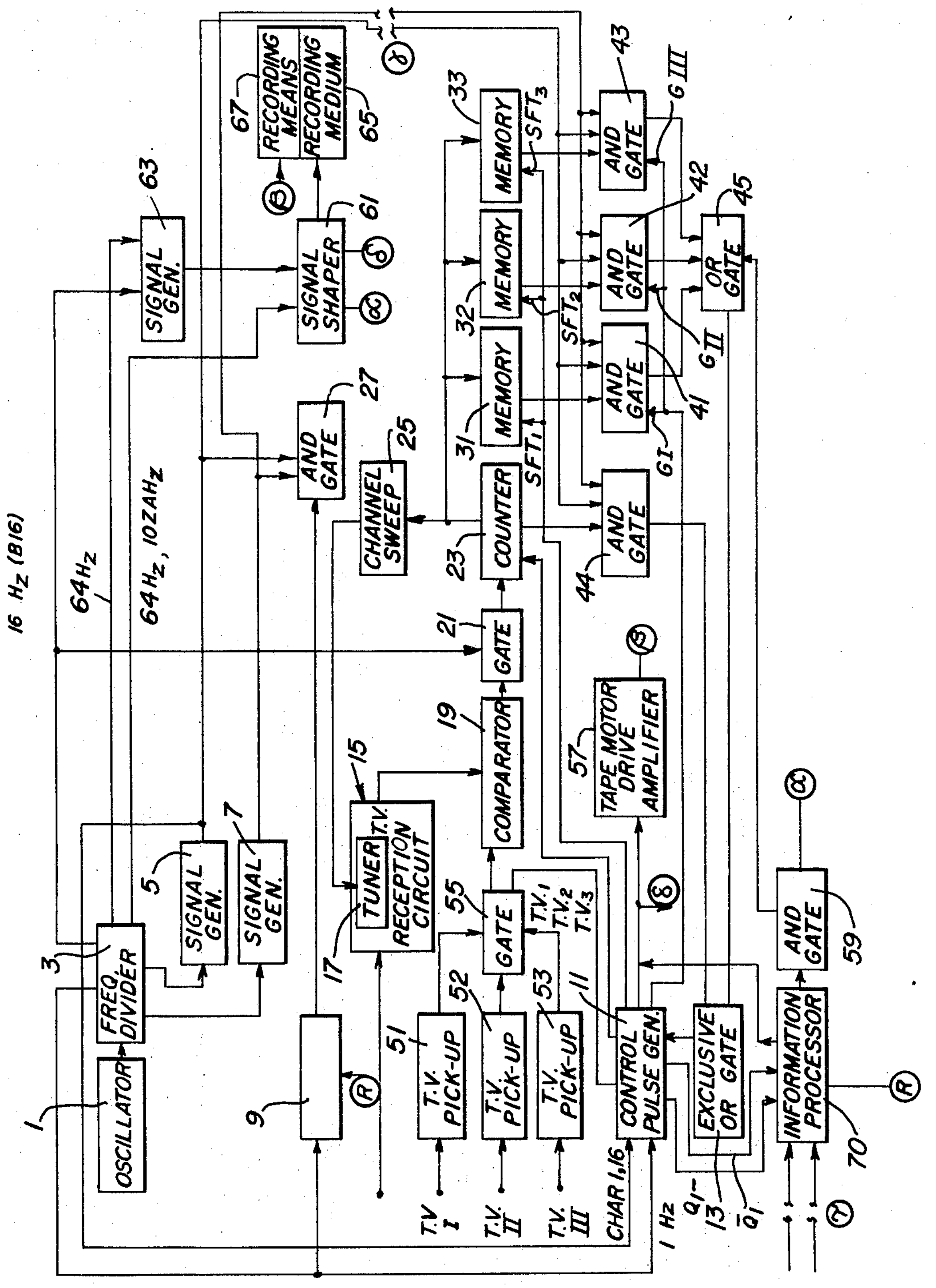

Referring to FIG. 1, reference numeral 1 designates a main oscillator. It is a crystal oscillator oscillating at a predetermined frequency, and it is used to produce control signals for the operation of the television audience measurement system, which contain character signals and bit signals for reading out the particular information and time signals. The output frequency of the main oscillator is divided by a frequency divider circuit 3 to obtain pulse signals of various frequencies.

The method of producing the character signals and bit signals will now be described. The character signals are produced from the output of the frequency divider. Frequencies of 1 Hz, 2 Hz, 4 Hz and 8 Hz are produced and fed to a character signal generator 5. The bit signals are produced by taking frequencies of 16 Hz and 32 Hz from the frequency divider and feeding them to a bit signal generator 7. In addition, signals opposite phase at the afore-mentioned frequencies are derived from the inverted phase outputs of respective intermediate stages of the frequency divider circuit.

Referring to FIG. *2a*, a pair of rectangular waves $C_1$ and $\overline{C_1}$ at 1 Hz, wave $\overline{C_1}$ of opposite phase to $C_1$, similar pairs of rectangular waves $C_2$ and $\overline{C}_2$ at 2 Hz, rectangular waves $C_4$ and $\overline{C}_4$ at 4 Hz and rectangular waves $C_8$ and $\overline{C}_8$ at 8 Hz are shown successively from the top.

The character signals are produced from the above rectangular signals. For example, character signal Char. 1 is obtained by passing the four signals $C_1$, $C_2$, $C_4$ and $C_8$ to an AND gate, character signal Char. 2 is obtained from four signals $C_1$, $C_2$, $C_4$ and $\overline{C}_8$, and character signal Char. 3 is obtained from four signals $C_1$, $C_2$, $\overline{C}_4$ and $C_8$. Likewise, character signal Char. 7 is obtained from four signals, $C_1$, $\overline{C}_2$, $\overline{C}_4$ and $C_8$. In this way, 16 different character signals Char. 1 through Char. 16 can be obtained. These character signals are used to determine the position of particular recorded information an by means of AND gate circuit construction to be described hereinafter.

Figure 2B:
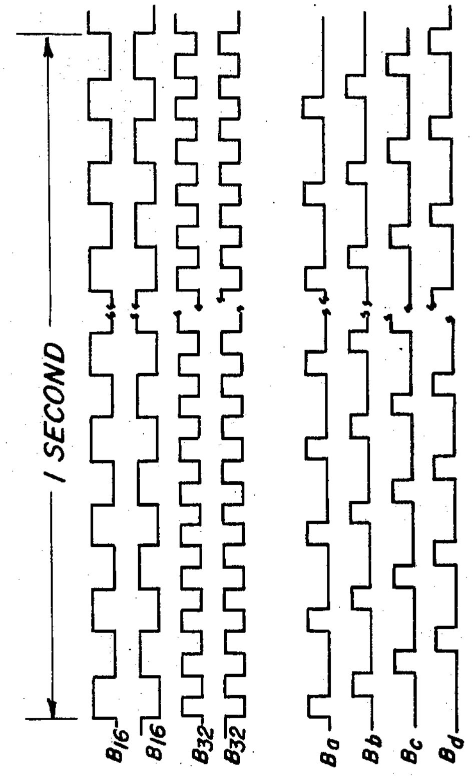

Referring to FIG. 2*b*, a rectangular wave $B_{16}$ at 16 Hz, a wave $\overline{B}_{16}$ of opposite phase to $B_{16}$, a rectangular wave $B_{32}$ at 32 Hz, and a wave $\overline{B}_{32}$ of opposite phase to $B_{32}$ are shown successively from the top.

The bit signals are produced from these rectangular signals. For example, bit signal $B_a$ is obtained by feeding two signals $B_{16}$ and $B_{32}$ to an AND gate. Likewise, bit signal $B_b$ is obtained from two signals $B_{16}$ and $\overline{B}_{32}$. In this way, four different bit signals $B_a$, $B_b$, $B_c$ and $B_d$ can be obtained. As later described in detail, these bit signals are supplied to an AND gate circuit to provide a particular information in binary form for recording.

As has been described, the character signals and bit signals are produced by adding in the AND gate the intermediate stage outputs and the 1 Hz final stage output of the frequency divider circuit.

Figures 2C, 8:
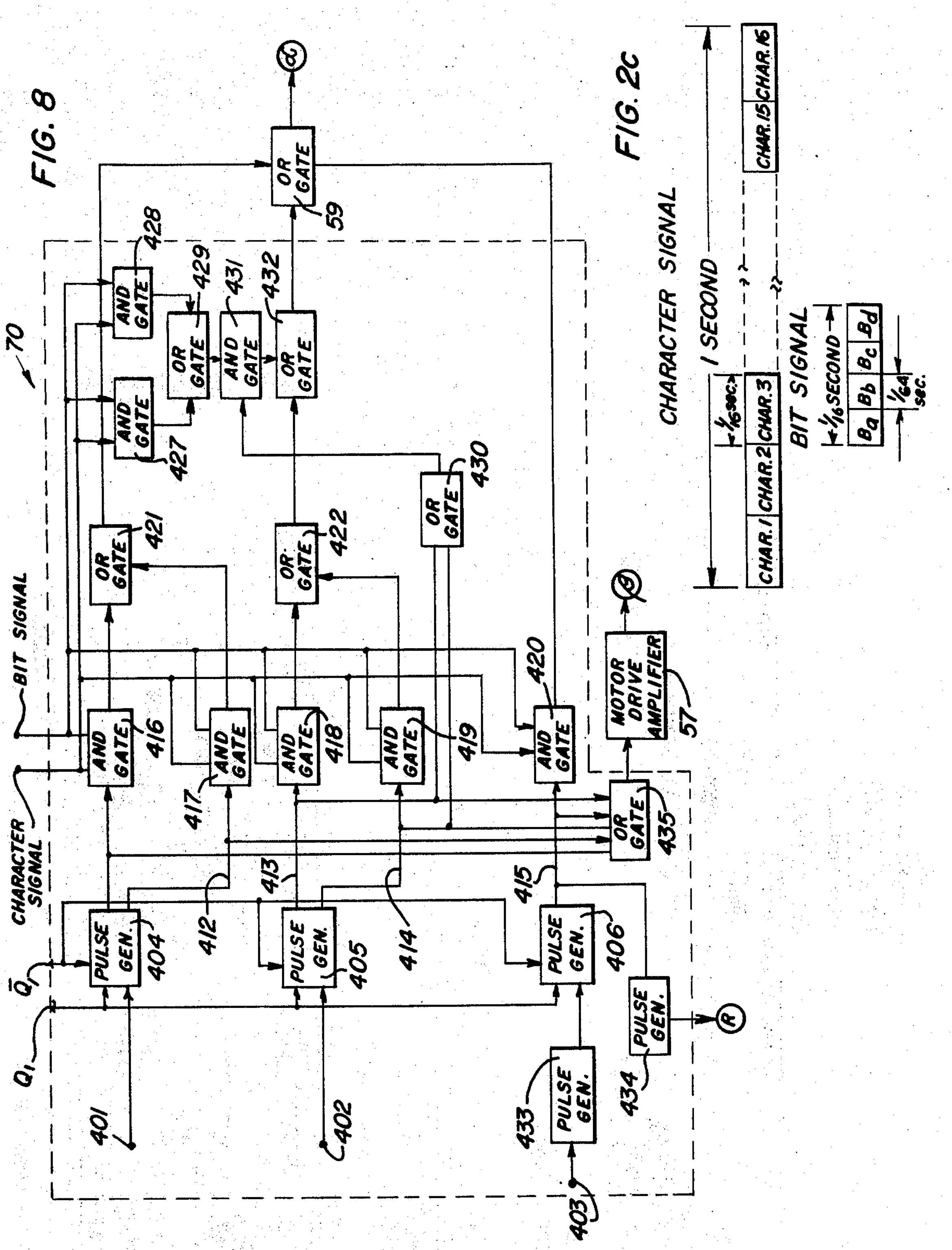
FIG. 8 is a block diagram showing a circuitry for recording other information than the channel reception data.

The timing relation between the character signals and bit signals is shown in FIG. 2*c*. It will be seen that one character consists of four bits, from which any number from 0 up to 15 may be obtained by utilizing the binary system. In the record signal arrangement according to the invention, 16 characters constitute one section, and unit information contains several words. The kind of information is determined by the order of occurrence of character signals.

The system according to the invention includes a television channel reception circuit 15, whose 4.5 MHz sound i-f signal output is compared in a sound i-f signal comparator 19 with sound i-f signals from home television receivers $TV_I$, $TV_{II}$ and $TV_{III}$. The television receivers $TV_I$, $TV_{II}$ and $TV_{III}$ are provided with respective pick-up circuits 51, 52 and 53, which filter 4.5 MHz sound i-f signals from the individual receivers and successively pass each through a gate 55 for one second to the comparator 19. To effect the switching of the 4.5 MHz sound i-f signals taken from the individual receivers and added to the gate 55, a gate control signal is provided by a control pulse generator 11, which will be described hereinafter in detail.

The television channel reception circuit 15 includes a tuner section 17, in which the available television channels are successively scanned by means of a channel sweep circuit 25. Taking the case when the sound i-f signal from the television receiver $TV_I$ is being monitored, the signal is compared with the output of the television channel reception circuit 15, until the channel to which TV is tuned coincides with one of the channels successively scanned in the tuner section 17.

When the channel being compared coincides with one of the scanned channels, the comparator 19 sends a pulse to gate 21. When this takes place, the subsequent 16 Hz rectangular wave signal from the frequency divider circuit 3 is blocked by the gate 21 and will not pass to counter 23. If this does not take place, the gate 21 is open with respect to the receiver $TV_I$ permitting the 16 Hz rectangular wave signal to pass to counter 23 for counting until the end of the scanning in the tuner section 17. Upon detection of the coincidence of the comparison channel, input to the counter is blocked as mentioned earlier, so that the counting is interrupted. Thus, the count immediately before the interruption of the counting operation corresponds to a channel to which receiver $TV_I$ is tuned.

Figure 3:
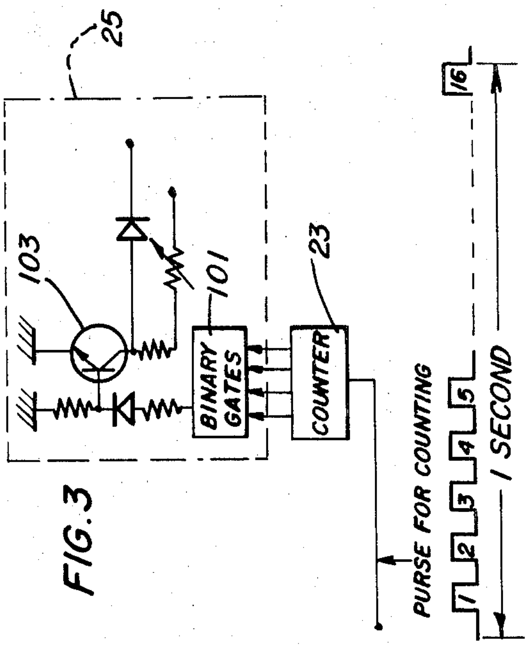
FIG. 3 is a schematic diagram showing the detailed construction of part of the channel sweep circuit.

FIG. 3 shows part of the channel sweep circuit 25 in detail. As mentioned earlier, each of the sound i-f signals filtered out by the individual pick-up circuits is passed through the gate 55 for one second. During this period, pulses from the frequency divider circuit are permitted through the gate 21 for counting. If no coincidence channel is detected in this period, the number 16 is counted. (This corresponds to the inoperative state of the television receiver being monitored.) In other words, the counter 23 is capable of counting from "1" to "16". The channel sweep circuit 25 includes 16 binary gates 101 corresponding to the successive counts "1" to "16". Upon reaching any one of the 16 counts, the corresponding gate provides an output, which is impressed on the base of an associated transistor 103 cutting off the same. During the presence of the output of the gate, i.e., for 1/16 second, a predetermined DC voltage prevailing at the collector of the associated transistor is added to a variable capacitance diode provided in the tuner section 17 permitting it to receive the corresponding channel. In this way, the available channels are successively scanned to provide the respective outputs from the channel reception circuit 15. It is to be noted that the channel sweep circuit 25 includes 16 circuits of the same construction each having gate 101 and transistor 103. The frequency involved here generally corresponds to the video intermediate frequency. The 4.5 MHz sound i-f signal is produced from suitable intermediate frequencies convenient for handling in the present system.

As the binary gates corresponding to the counts "1" to "16" are successively opened, pre-set voltages for individual channels are successively impressed on the associated variable capacitance diodes connected in cascade, thereby rendering operative successive high frequency tuned circuits to provide respective sound i-f signals to the sound i-f signal comparator 19.

While the present embodiment is designed to be able to scan 16 different channels, it is possible to adapt the system to scan any desired number of channels by appropriately changing the frequency of the rectangular signal input to the gate 21 and the channel sweep circuit.

Figure 4:
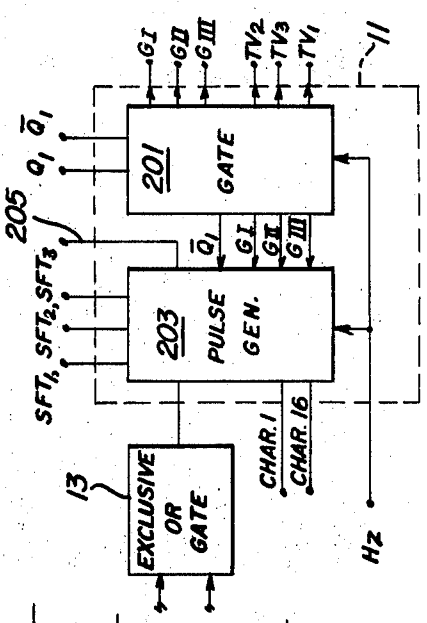
FIG. 4 is a schematic representation of the control pulse generator circuit.

FIG. 4 shows the control pulse generator circuit 11. It includes a gate circuit 201, in which gating signals $TV_1$, $TV_2$ and $TV_3$ required for the gate 55 and gating signals $G_I$, $G_{II}$ and $G_{III}$ for AND gate 41, 42 are produced from the 1 Hz rectangular wave signal produced from the frequency divider 3.

Figure 5:
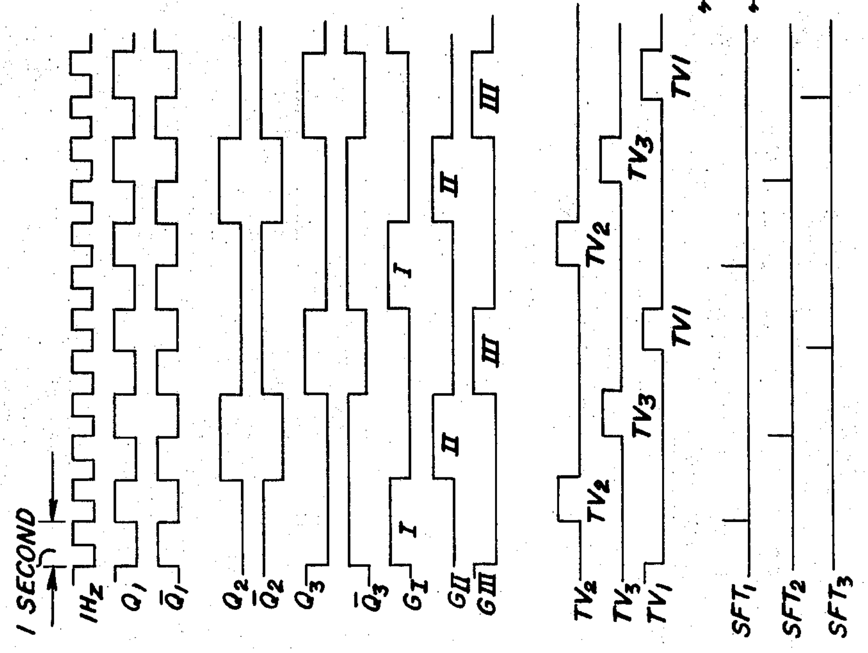
FIG. 5 is a chart showing the time relationship of waveforms produced at various parts of the control pulse generator circuit.

FIG. 5 is a time chart showing waveforms of various pulse signals produced in the control pulse generator 11 shown in FIG. 4. These signals will now be described. Signals $Q_1$ and $\overline{Q}_1$ (FIGS. 4 and 5) are produced by converting the 1 Hz rectangular signal input into ½ Hz through by means of a first-stage flip-flop in the gate circuit 201. The signal $\overline{Q}_1$ is produced by inverting the signal $Q_1$. Signals $Q_2$ and $\overline{Q}_2$ are produced by the so-called counter circuit technique by adding the signal $Q_1$ to second-stage and third-stage flip-flop and feeding the outputs thereof to the respective previous stage flip-flops. The signal $\overline{Q}_2$ is opposite in phase to the signal $Q_2$. Likewise, signals $Q_3$ and $\overline{Q}_3$ are also produced.

The signals $TV_1$, $TV_2$ and $TV_3$ and signals $G_I$, $G_{II}$ and $G_{III}$ are produced from suitable combinations of the above signals $Q_1$, $\overline{Q}_1$, $Q_2$, $\overline{Q}_2$, $Q_3$ and $\overline{Q}_3$ and the 1 Hz original signal. More particularly, the signal $G_I$ is obtained by adding the signals $\overline{Q}_2$ and $\overline{Q}_3$ to an AND gate. It is expressed as $G_I = \overline{Q}_2 \cdot \overline{Q}_3$. Similarly, the other signals are produced as $G_{II}=Q_2 \cdot \overline{Q}_3$, $G_{III}=\overline{Q}_2 \cdot Q_3$, $TV_2=G_I \cdot Q_1$, $TV_3=G_{II} \cdot Q_1$, and $TV_1=G_{III} \cdot Q_1$.

The control pulse generator circuit 11 also includes another gate circuit 203, in which shift pulses $SFT_1$, $SFT_2$ and $SFT_3$ for changing the contents of memories 31, 32 and 33 and a motor drive rectangular wave are produced. Reference numeral 205 in FIG. 4 shows an output terminal, at which the motor drive rectangular wave appears. The production of the shift pulses will be described later.

The production of the motor drive signal will first be described.

When a shift pulse corresponding to any one of the gating signals $G_I$, $G_{II}$ and $G_{III}$ (a pulse with a pulse length of 2 seconds) is produced, it is used to open a gate to permit the latter half of the 2-second pulse to pass, the aforesaid gate being closed by a trigger signal produced by the output of an AND gate receiving the signal $\overline{Q}_1$ and signal Char. I, whereby a pulse having a pulse width of about 1 second and substantially timed to the pulse $Q_1$ is obtained at terminal 205. This pulse is used as the motor drive signal; it is power-amplified through a motor-drive amplifier 57, thereby driving a tape drive motor 67 to drive the recording tape 65 for recording of information during this period. The other information is also recorded under the control of an information processing circuit 70, which will be described later.

The counter 23 is cleared by a trigger signal produced by the leading edge of the afore-said pulse $Q_1$, and it repeats counting operation for at most one second in every two seconds.

Figure 2A:
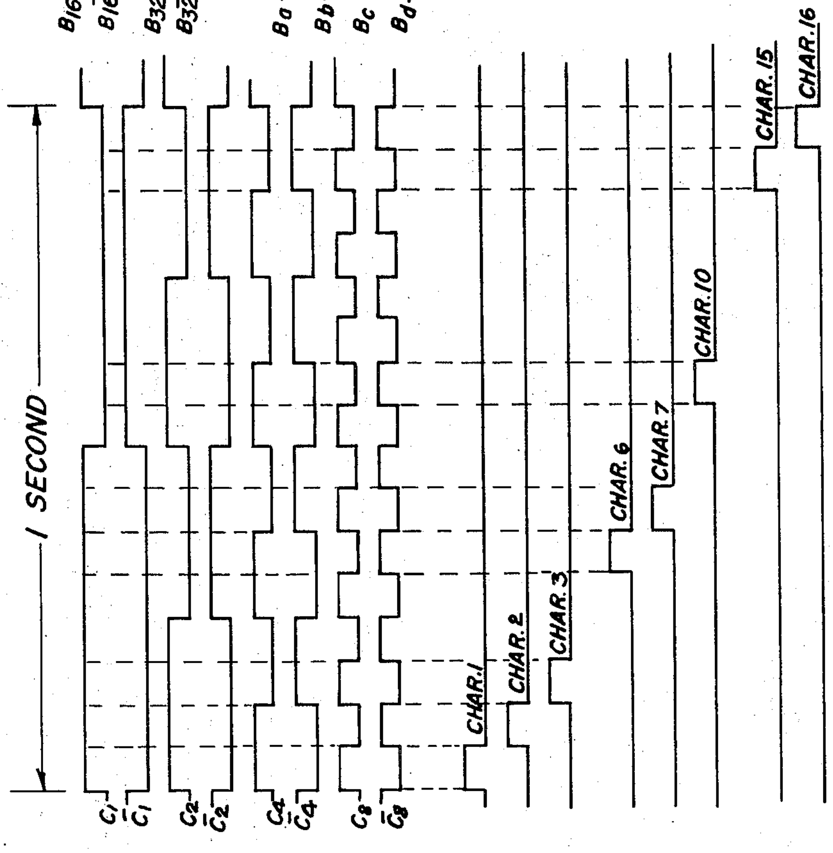

The production of the shift pulses will now be described in connection with the operation of an exclusive OR gate circuit 13, which checks whether or not the prevailing intelligence coincides with the previous memory content. The exclusive OR gate 13 compares the counter content and memory content, and if and only if both the comparison contents do not coincide, does produce an output signal, which is passed to the control pulse generator 11. The counter content is successively read out and passed through an AND gate 44 in the form of character and bit signals, while the content of one of the memories 31, 32 or 33 is simultaneously read out and passed through one of the AND gates 41, 42 or 43, for instance memory 31 and AND gate 41 are used in the case where the comparison is being done with respect to the television receiver $TV_I$, so that both the contents simultaneously read out are compared in the exclusive OR gate 13. The exclusive OR gate produces an output signal only when both the comparison contents do not coincide, that is, only when the channel is different from the previous channel. The shift pulse generating section 203 in FIG. 4 consists of three four-input AND gates. The four inputs to each AND gate are the gating signal $G_I$, $G_{II}$ or $G_{III}$, character signal Char. 16 (FIG. 2*a*), exclusive OR gate output signal and signal $\overline{Q}_1$. The shift pulses $SFT_1$, $SFT_2$ and $SFT_3$ are produced from AND gates respectively receiving the signals $G_I$, $G_{II}$ and $G_{III}$, and their timing is determined by the signal Char. 16. If both the comparison contents are identical, the exclusive OR gate does not produce any output signal. In this case, no AND holds, so that no shift pulse is produced. Also, in the one-second latter half of the two-second pulse period of the signals $G_I$, $G_{II}$ and $G_{III}$, the signal $\overline{Q}_1$ is absent, so that no shift pulse is produced in this period. The timing of the individual shift pulses produced in the above manner is shown in FIG. 5.

The operation of the present embodiment of the audience measurement system when all the receivers belonging thereto are operating will now be described with reference to FIG. 5. It is assumed that the gate 55 is opened by the gating signal $TV_2$. In this case, the pick-up circuit 52 is selected, and the 4.5 MHz sound i-f signal taken from the television receiver $TV_{II}$ is introduced to the sound i-f signal comparator 19. Meanwhile, the 16 Hz signal from the frequency divider is passed through the gate 21 which is the open state and is counted and is retained by the counter 23. At the same time, the content of the counter is ready for registering in parallel memories 31, 32 and 33 which are located in parallel with the counter. If the gate of one of these memories is opened by a shift pulse, the memory content of that memory circuit is cleared first and then the new content of the counter is registered and memorized and simultaneously the new content is read out and passed through one of the AND gates 41, 42 or 43 corresponding to that memory circuit and also through OR gate 45 to enter the exclusive OR gate 13. The pulses of the 16 Hz signal, while being counted by the counter from the first pulse, are also coupled to the channel sweep circuit 25. On the basis of these pulses, the channel sweep circuit 25 successively provides different voltages to the tuner section 17, which, upon receipt of each of the supplied voltages, tunes a channel corresponding to the voltage and in turn provides the corresponding sound i-f signal to the comparator 19. Thus, the sound i-f signal from the receiver $TV_{II}$, which is being supplied to the comparator 19 as mentioned earlier, is compared with the successive i-f signals coming from the television channel reception circuit 15. Now, for instance, if sound i-f the signal produced by the television channel reception circuit 15, on the basis of the tenth pulse in the 16 Hz signal passed through gate 21 and counter 23 to channel sweep circuit 25, is detected to be from the same program as the sound i-f signal from the receiver $TV_{II}$, the comparator 19 produces a pulse signal, whereupon the gate 21 is closed to block the 16 Hz signal, so that the counting in the counter 23 and the channel sweeping in the tuner section 17 are stopped. In this case, the channel tuned in the receiver $TV_{II}$ corresponds to the tenth voltage, indicating that it is identical with the channel received in the television channel reception circuit 15. At this time, the content "10" of the counter 23 is retained, and the parallel memories are ready for registering the counter content upon reception of the corresponding shift pulse.

The above operation proceeds during one-second pulse period of the signal $TV_2$.

After this period has elapsed, the subsequent period of the AND gate gating pulse $G_{II}$ begins. The AND gate 42 (as well as 41 and 43) is a four-input AND gate receiving the memory output, character signal, bit signal and gating signal $G_{II}$. Upon receipt of the gating pulse, the content of the memory 32 is successively read out and passed through the AND gate 42 and OR gate 45 to the exclusive OR gate according to the predetermined order of the character signals and bit signals. Concurrently, the retained content of the counter 23, representing the aforementioned channel to which receiver $TV_{II}$ is tuned is read out and passed through the AND gate 44 to the exclusive OR gate in the same order as the output of the OR gate 45. Thus, the memory content and counter content are compared in the exclusive OR gate.

If the content of the character supplied from the AND gate 44 is different from the content of the character supplied from the OR gate 45 (more specifically, if both characters are different in the phase-position or distribution of bit signals in a single character), the exclusive OR gate 13 produces an output signal. The fact that the counter content and memory content do not coincide means that the tuning of receiver $TV_{II}$ has been switched to another channel. The output signal produced by the exclusive OR circuit 13 is immediately fed to the control pulse generator 11 together with the other three inputs, namely signal $\overline{Q}_1$, signal $G_{II}$ and character signal Char. 16, thus producing the shift pulse $SFT_2$ as mentioned earlier. This shift pulse immediately opens the gate of the memory 32, whereupon the previous content representing the previous count of the counter is cleared and a new content is registered and memorized. The new content is then passed to the AND gate 42.

The operation up to this instant is effected in the one-second first half of the gating pulse $G_{II}$. When the one-second second half of the gating pulse $G_{II}$ sets in, the gating signal $TV_3$ appears at the gate 55, whereupon the comparison of the sound i-f signal of the channel tuned in the receiver $TV_{III}$ through the channel sweeping begins. This operation is entirely the same as the previous comparison with respect to the receiver $TV_{II}$.

The afore-mentioned new content registered in the memory 32 is now read out and passed through the AND gate 42 under the control of the character signals and bit signals also entering the AND gate 42, and is then passed through OR gates 45 and 59, and shaped in a recording signal shaping circuit 61 for recording in the tape recorder 67 in synchronization with the motor drive operation. At the instant the above recording is ended, the channel scanning with respect to the receiver $TV_{III}$ is just over. In the subsequent one-second first half of the gating pulse $G_{III}$, the contents of the circuits 23 and 33 are compared. If the previous channel remains tuned in the receiver $TV_{III}$, no shift pulse is generated. In this case, the motor drive is not rendered operative, so that no recording is effected. Without generation of the shift pulse $SFT_3$, in the recording period in the second half of the gating pulse $G_{III}$ the previous content of the counter is not passed to the memory 33 but is retained in the counter. During the above recording period, the channel scanning with respect to the receiver $TV_I$ is effected. In this way, a similar sequence of events proceeds. The recording and channel sweeping are effected concurrently; in the recording period with respect to the receiver $TV_I$ the channel sweeping with respect to the receiver $TV_{II}$ is effected with the gate opened by the signal $TV_2$, in the recording period with respect to the receiver $TV_{II}$ the channel sweeping with respect to the receiver $TV_{III}$ is effected with the gate opened by the signal $TV_3$, and in the recording period with respect to the receiver $TV_{III}$ the channel sweeping with respect to the receiver $TV_I$ is effected with the gate opened by the signal $TV_1$, as is seen from FIG. 5.

The signals $G_I$, $G_{II}$ and $G_{III}$ and signals $TV_2$, $TV_3$ and $TV_1$ are produced irrespective of whether any receiver is operative or inoperative, and the receivers are scanned in the order of $TV_I$, $TV_{II}$ and $TV_{III}$. For an inoperative receiver the counting operation of the counter 23 proceeds for one second to count 16 pulses, and its count result is retained until it is cleared by the leading edge of the pulse $Q_1$.

The system according to the invention is provided with a power supply not shown, so that its operation can be continued even at the time of interruption of the commercial power source. Also, information concerning the power stoppage is recorded through the OR gate 59. When the power is stopped or when the scanned receiver is inoperative, "0" channel is recorded by counting 16 pulses of the 16 Hz signal. If no shift pulse is produced in the comparison of the recorded "0" channel with the subsequent counter content, that is, if the receiver remains inoperative during the subsequent channel scanning, the count "16" is repeated. In this case, the counter content and memory content coincides, so that no shift pulse is produced and no recording is effected.

The recording signal shaping circuit 61 and character end signal generator 63 will now be described in detail with reference to FIGS. 6 and 7.

Figure 6:
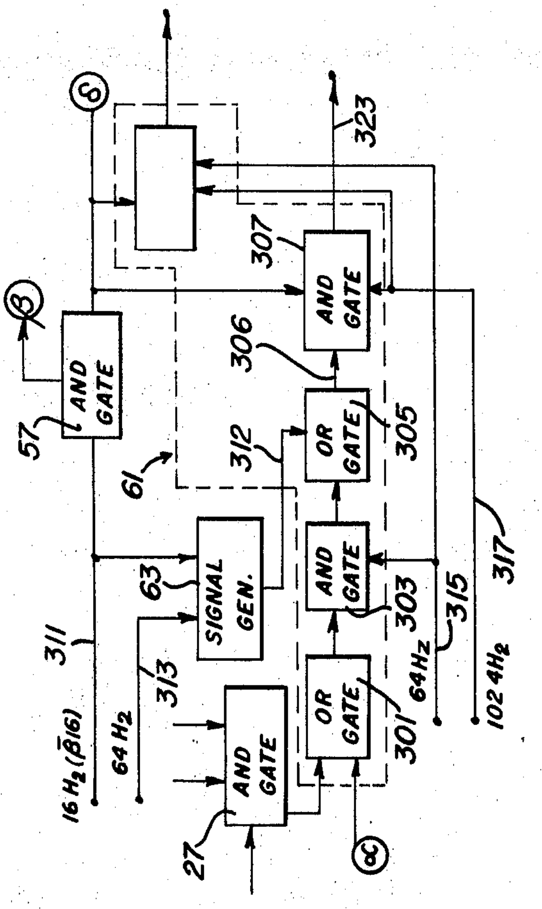
FIG. 6 is a block diagram showing the character end signal generator and recording signal shaping circuit.
Figure 7:
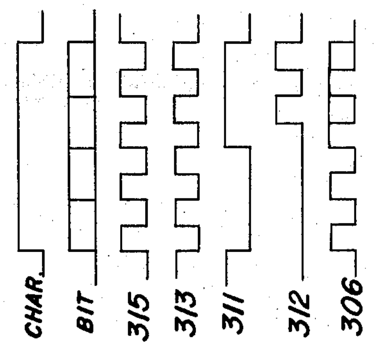
FIG. 7 is a waveform chart showing waveforms appearing at various parts shown in FIG. 6.

In FIG. 6, the shaping circuit 61 is shown enclosed by a chain line, and FIG. 7 is a time chart showing waveforms appearing at various points shown in FIG. 6. On a line 311 there appears rectangular wave input signal at 16 Hz, which is the same as the signal $\overline{B}_{16}$ shown in FIG. 2b. On a line 313 appears a rectangular wave input signal at 64 Hz. These two inputs are passed through an AND gate 63 to produce a character end signal 312 (FIG. 7), which is fed to an OR gate 305. A signal representing time is produced by an AND gate 27 shown in FIG. 1 and constitutes one of two inputs to an OR gate 301 shown in FIG. 6. It will be readily understood from FIG. 1 that the recording of data concerning time is always done when other data is recorded. The other input labelled $\alpha$ passed to the OR gate 301 contains information concerning the channel selection and other information.

The output of the OR gate 301 is passed to an AND gate 303, and is added to a 64 Hz signal (FIG. 7) appearing on line 315. In the AND gate 303, the second half of the pulse length of the information bit signal is removed by reduce the pulse length of bit signal to one half. In the next-stage OR gate 305, the output of the AND gate 303 is combined with the afore-mentioned end of character signal 312 to produce a composite pulse signal 306. It will be seen that at the time of recording the bit signals in each character signal are reduced to one-half the pulse length, while the last two bits are combined with the signal 312 into the full length. This full length signal is interpreted as an end of one character at the time of reading the record.

The composite pulse signal 306 is added to a next-stage AND gate 307, to which a 1,024 Hz signal appearing on a line 317 is also added, and whose output appearing on a line 323 is recorded on a recording tape 65 in synchronization with the one-second length motor drive pulse from the control pulse generator 11. Here the low frequency rectangular wave signal is combined with a signal at about 1 kHz to produce a continuous rectangular wave with a frequency of about 1 kHz, so that the low frequency data signals so combined can be recorded using conventional recording means.

The shaping circuit 61 includes a further AND gate 309, which receives the 64 Hz signal 315, the 1,024 Hz signal and a one-second pulse signal appearing at in input terminal labelled δ and converts them into a pulse series at 64 Hz, in phase with the signal pulse and containing the 1,024 Hz signal. This pulse series is recorded as reference signal on a separate track of the magnetic tape 65 from the data date signal track in the same. The rectangular motor drive signal labelled β, which is produced from the motor-drive amplifier 57, is coupled to the motor 67 to drive the same for recording the data signal on line 323 and reference signal on line 321 on the said recording tape.

The recording of the other information will now be described. The information concerning the start and stop of the present system, any occurrence of interruption of the commercial power source, clock correction, the number of the area in which the audience data is collected, the number of the home to which the sample receivers belong and so forth is recorded through the information processing circuit 70, shown in detail in FIG. 8. Regarding the start or stop of the present system, the time of start or stop (day, hour, minute and second), area number, home number and the fact of starting or stopping the system are recorded in the recorder. In the other cases, the fact and the time in which the fact has taken place are recorded.

If power stoppage occurs, upon its recovery a positive DC voltage appears at a terminal 401. This DC voltage may be obtained by rectifying the AC source voltage. When this voltage is present, pulse generator 404 is held in its first state. In this state, when the aforementioned pulses $Q_1$ and $\overline{Q}_1$ are supplied to the pulse generator 404 a single pulse 1′, in phase with a single $Q_1$ pulse, at the output 411. In other words, although the pulse signals $Q_1$ and $\overline{Q}_1$, supplied to the pulse generator 404 are continuous rectangular waves, the pulse generator produces only a single pulse $Q_1'$, which is in phase with a single $Q_1$ pulse. When the power stoppage subsequently takes place, the afore-mentioned DC voltage at terminal 401 is no longer present. In the absence of this voltage, the pulse generator is held in its second state. In this state when the pulses $Q_1$ and $\overline{Q}_1$ are passed to the pulse generator, a single pulse is similarly obtained at the other output 412. These pulses are passed to respective AND gates 416 and 417 and encoded into a predetermined code with character signals and bit signals to indicate the occurrence or recovery of the power stoppage. The code thus obtained is passed through an OR gate 421 and the OR gate 59 for recording.

The description will now proceed in connection with the recording of data pertaining to the start and stop of the system's operation. At the time of the commencement of operation, the system can be activated by supplying the source voltage to a predetermined part of the system either by having a switch upon the mounting of said tape recorder 67 actuated mechanically by starting the tape recorder or by actuating a separate manual switch. Upon starting a constant positive DC voltage is present at a terminal 402. At the time the system is stopped, the positive DC voltage at terminal 402 is removed.

The operation is similar to the aforedescribed operation of recording the power stoppage, except in that the area number and home number are simultaneously recorded with the system activation data. This is because at the time of starting and stopping the system or collecting the recorded tape it is necessary to indicate where the recording was made. Character signals and bit signals as mentioned earlier are again used to produce the area number by means of AND gate 427 and produce the home number by means of AND gate 428. The area number and home number are combined with each other by means of OR gate 429, and the combined signal is then passed through an AND gate 431 opened by the application of the output signal from pulse generator 405 to OR gate 432, where said signal is combined with the start or stop information. The resultant output of the OR gate 432 is passed through the OR gate 59 for recording. An OR gate 430 is provided activates the recording at the time of the starting or stopping the system. The output α of the gate 59 shown in FIG. 8 is the same as the output of the gate 59 shown in FIG. 1, and similarly with respect to the other reference symbols and numerals.

The description will now proceed in connection with a circuit for recording the clock correction information. By using a medium wave receiver (not shown), a time tone at of 880 Hz in a selected announcement of time is received once every day through a filter (not shown). The rising portion of the first wave of this tone activates mono-stable circuit 433 so as to produce a rectangular wave with a pulse length of one second to 1½ seconds.

The above rectangular wave with a pulse length of at least one second and pulse signals $Q_1$ and $\overline{Q}_1$ are passed to a pulse generator 406 to produce a single pulse $Q_1'$ in phase with $Q_1$ and with a one-second pulse length, on output line 415. The pulse thus produced is encoded through an AND gate 420 in a manner similar to the afore-mentioned the occurrence and recovery of power stoppage and the start and stop of the operation of the system. The single pulse $Q_1'$ is also used to produce a trigger pulse by means of a differentiating circuit 434, whose output pulse is passed to clock circuit 9 for the clock correction.

When a single pulse $Q_1'$ appears on output lines 411, 412, 413, 414 or 415, it is passed through an OR gate 435 to the motor-drive amplifier 57 for power amplification to the required level to drive the motor for recording the aforementioned various information on the magnetic tape.

As has been described in the foregoing, according to the invention, each of the required information items is supplied from the associated circuit in terms of the bit signals and is recorded on the tape at positions determined by the character signals.

Also, with the system according to the invention, information regarding a plurality of television receivers in the same home can be readily recorded.

Further, the system according to the invention can wholly consist of electronic circuits, which may be contained in a semiconductor integrated circuit, so that it is possible to have an extremely small-size system.

I claim:

1. A television audience measurement system comprising:

a plurality of pick-up circuits each connected to a monitored television receiver to receive sound i-f signals from the monitored television receivers; a first gate circuit connected to each to the output terminals of said pick-up circuits; a television channel reception circuit for receiving television broadcast signals; a comparator connected to said first gate and said television channel reception circuit for comparing signals from said first gate and TV channel reception circuit; an oscillator for producing character signals, bit signals and control signals, said character and bit signals being used for coding transmitting and recording data within the system, said control signals being used to provide reference and activation signals for the operation of said system; a second gate circuit connected to said comparator and said oscillator; a counter for counting pulses supplied from said oscillator via said second gate circuit; a channel sweep circuit for scanning channels in said channel reception circuit with reference to the count result of said counter; a memory circuit for each of said monitor television receivers and connected to the output terminals of said counter; a first AND gate circuit connected to said counter and said oscillator to provide the instantaneous count result from said counter when the signals from the counter and the character and bit signals from said oscillator are simultaneously supplied to the first AND gate; a plurality of second AND gate circuits each connected to one of said memories and to said oscillator to produce the preceding count result when the signals from the memory and the character and bit signals from said oscillator are simultaneously supplied to the second AND gates; a first OR gate circuit connected to said second AND gates; an exclusive OR gate circuit connected to said first AND gate and to said first OR gate; a recording means connected to said first OR gate to record information from the memories; and a control pulse generator circuit, the input terminals of the said control pulse generator being connected to said exclusive OR Circuit and said oscillator, while the output terminals of the control pulse generator are connected to said first gate circuit, said counter, said recording means, said memories and said second AND gates to provide control signals thereto.

2. The television audience measurement system according to claim 1 wherein said system further comprises a character end signal generator and a recording signal shaping circuit, said character end signal generator being connected to said oscillator, and said recording signal shaping circuit being connected to said character end signal generator, said first OR gate, said control pulse generator circuit and said oscillator to produce the information output signals for said recording means.

3. The television audience measurement system according to claim 2 wherein said character end signal generator is an AND gate circuit, the input terminals of which are connected to said oscillator, the output signal of said character end signal generator being supplied to said recording signal shaping circuit, and said recording signal shaping circuit includes a third OR gate circuit, a fourth AND gate circuit a fourth OR gate circuit and a fifth AND gate circuit, said third OR circuit being connected to said first OR gate to produce the output signal for said fourth AND gate, said fourth AND gate being connected to said third OR gate and said oscillator, said fourth OR gate being connected to said fourth AND gate and to said character end signal generator, said fifth AND gate being connected to said fourth OR gate and said control pulse generator circuit to produce the information output signal for said recording means.

4. The television audience measurement system according to claim 3 wherein said fifth AND gate circuit is further connected to said oscillator, said fifth AND gate being adapted to handle a signal of such a frequency as is advantageous to magnetic tape recording.

5. The television audience measurement system according to claim 3 wherein said recording signal shaping circuit further comprises a sixth AND gate circuit, the input terminal of said sixth AND gate being connected to said oscillator, the other input terminal of said sixth AND gate being connected to said control pulse generator circuit, the output signal of said sixth AND gate being supplied to said recording means and recorded as the reference signal.

6. The television audience measurement system according to claim 5 wherein another input terminal of said fifth AND gate circuit is connected to another output terminal of said oscillator and another input terminal of said sixth AND gate circuit is connected to said other output terminal of said oscillator, while the output signal of said fifth AND gate is recorded as the information signal on the information signal track on the recording tape and the output of said sixth AND gate is recorded as the reference signal on the reference signal track on the recording tape, and said fifth and sixth AND gates being adapted to handle a signal of such a frequency as is advantageous to magnetic tape recording.

7. The television audience measurement system according to claim 1 wherein said system further comprises a recording signal shaping circuit which comprises a fifth AND gate circuit, the input of said fifth AND gate circuit being connected to said first OR gate circuit and to said oscillator, the output signal of said fifth AND gate being supplied to said recording means, and said fifth AND gate being adapted to handle a signal of such a frequency as advantageous to magnetic tape recording.

8. The television audience measurement system according to claim 1 wherein said system further comprises an information processing circuit, a second OR gate circuit, a clock circuit, a third AND gate circuit, a recording signal shaping circuit and a motor-drive amplifier; said recording signal shaping circuit comprising a third OR gate circuit; said information processing circuit being connected to said control pulse generator circuit and said oscillator to produce the output signal for said motor-drive amplifier, said second OR gate circuit and said clock circuit; said second OR gate circuit being connected to said first OR gate circuit; said processing circuit produces the input signal for said third OR gate circuit; said clock circuit being connected to said processing circuit and said oscillator to produce the input signal for said third AND gate circuit; said third AND gate circuit being connected to said clock circuit and said oscillator to produce the input signal from said third OR gate circuit when the signal from said clock circuit and the character and bit signals from said oscillator are simultaneously supplied to said third AND gate circuit; said third OR gate circuit being connected to said second OR gate circuit and said third AND gate circuit to produce the input signal for said recording means; said motor-drive amplifier amplifying the motor driving pulse signals which are produced from said control pulse generator circuit, and when the date signals are recorded by the recording means, the output pulse signal from the motor-drive amplifier is simultaneously supplied to the recording means driving same.

9. The television audience measurement system according to claim 8 wherein said system further comprises a character end signal generator which is an AND circuit, its input terminals being connected to said oscillator, its output signal being supplied to said recording signal shaping circuit;

said recording signal shaping circuit further includes a fourth AND gate circuit, a fourth OR gate circuit and a fifth AND gate circuit;

said third OR gate circuit being connected to said second OR gate and said third AND gate to produce the input signal for said fourth AND gate;

said fourth AND gate being connected to said third OR circuit and to said oscillator;

said fourth OR gate being connected to said fourth AND circuit and said character end signal generator to produce the input for said fifth AND gate;

said fifth AND gate being connected to said fourth OR gate and said control pulse generator circuit to provide the input signal for said recording means.

10. The television audience measurement system according to claim 9 wherein said fifth AND gate circuit is further connected to said oscillator, said fifth AND gate being adapted to handle a signal of such a frequency as advantageous to magnetic tape recording.

11. The television audience measurement system according to claim 9 wherein said recording signal shaping circuit further comprises a sixth AND gate circuit, the input terminal of said sixth AND gate being connected to said oscillator, the other input terminal of said sixth AND gate being connected to said control pulse generator circuit, the output signal of said sixth AND gate being supplied to said recording means and recorded as the reference signal.

12. The television audience meaasurement system according to claim 11 wherein another input terminal of said fifth AND gate circuit is connected to another output terminal of said oscillator, and another input terminal of said sixth AND gate circuit is connected to said other output of said oscillator, while the output signal of said fifth AND gate is recorded as the information signal on the information signal track on said recording tape and the output of said sixth AND gate is recorded as the reference signal on the reference signal track on said recording tape, and said fifth and sixth AND gates being adapted to handle a signal of such a frequency as advantageous to magnetic tape recording.

13. The television audience measurement system according to claim 8 wherein said recording signal shaping circuit further comprises a fifth AND gate circuit, the input of said fifth AND gate being connected to said third OR circuit and said oscillator, and the output of said fifth AND circuit being connected to said recording means; and said fifth AND circuit being adapted to handle a signal of such a frequency as advantageous to magnetic tape recording.

14. The television audience measurement system according to claim 8 wherein said information processing circuit comprises:

a first pulse generator responsive to interruption and recovery of electric power to produce two different pulse signals representing interruption and recovery of electric power, said first pulse generator being connected to said control pulse generator;

a seventh AND gate circuit to provide output signal in response to the simultaneous arrival of said pulse signal representing the interruption of electric power, said character signal and said bit signals;

a eighth AND gate circuit to provide output signal in response to the simultaneous arrival of said pulse signal representing the recovery of electric power, said character signal and said bit signals;

a second pulse generator responsive to the start and the stop of the system to generate two different pulse signals representing the start and the stop of the system, said second pulse generator being connected to said control pulse generator;

a ninth AND gate to provide output signal in response to the simultaneous arrival of said pulse signal representing the start of the system, said character signal and said bit signals;

a tenth AND gate to provide output signal in response to the simultaneous arrival of said pulse signal representing the stop of the system, said character signal and said bit signals;

eleventh and twelfth AND gates to provide output signals in response to the simultaneous arrival of said character and bit signals, said output signals representing home number and area number;

a fifth OR gate to receive output signals from said eleventh and twelfth AND gate circuits;

a sixth OR gate connected to the output terminals of said second pulse generator to receive said two different pulse signals representing the start and the stop of the system;

a thirteenth AND gate to receive output signals from said fifth and sixth OR gates;

a third pulse generator responsive to the time correction by said clock circuit to generator pulse signals;

a fourth pulse generator connected to said third pulse generator and to said control pulse generator;

a trigger pulse generator for generating trigger pulse signal for time correction, said trigger pulse generator being connected to said fourth pulse generator;

a seventh OR gate circuit for providing motor-driving signals via said motor-drive amplifier, said seventh OR gate being connected to the output terminals of said first, second and fourth pulse generator;

a fourteenth AND gate to provide output signal in response to the simultaneous arrival of output pulse signal from said fourth pulse generator, said character signal and said bit signals; and the output signals from said seventh, eighth, ninth, tenth, thirteenth and fourteenth AND gates being supplied to said second OR gate.

* * * * *